United States Patent
Heberle et al.

(10) Patent No.: US 12,212,684 B2
(45) Date of Patent: Jan. 28, 2025

(54) METHOD FOR THE DIGITAL SIGNING OF A MESSAGE

(71) Applicant: Robert Bosch GmbH, Stuttgart (DE)

(72) Inventors: Lukas Heberle, Stuttgart (DE); Friedrich Wiemer, Pleidelsheim (DE); Ralf Kible, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 547 days.

(21) Appl. No.: 17/449,372

(22) Filed: Sep. 29, 2021

(65) Prior Publication Data
US 2022/0109579 A1    Apr. 7, 2022

(30) Foreign Application Priority Data
Oct. 1, 2020   (DE) .......................... 102020212451.5

(51) Int. Cl.
*H04L 9/32*    (2006.01)
(52) U.S. Cl.
CPC .......... *H04L 9/3247* (2013.01); *H04L 9/3242* (2013.01); *H04L 9/3239* (2013.01)
(58) Field of Classification Search
CPC .... H04L 9/3247; H04L 9/3242; H04L 9/3239
See application file for complete search history.

(56) References Cited

U.S. PATENT DOCUMENTS

| | | | | |
|---|---|---|---|---|
| 2002/0078351 A1* | 6/2002 | Garib | ................. | G06Q 20/3674 |
| | | | | 713/168 |
| 2011/0055585 A1* | 3/2011 | Lee | ........................ | H04L 9/3226 |
| | | | | 713/183 |
| 2018/0082065 A1* | 3/2018 | Liu | ........................ | H04L 9/3247 |

FOREIGN PATENT DOCUMENTS

| | | | | | |
|---|---|---|---|---|---|
| CN | 102754361 A | * | 10/2012 | ............. | H04B 7/155 |
| CN | 105530246 A | * | 4/2016 | ............. | G06F 21/45 |
| CN | 107223322 A | * | 9/2017 | ........... | H04L 9/3242 |
| CN | 107657553 A | * | 2/2018 | | |
| EP | 2869231 A1 | * | 5/2015 | ............. | G06F 21/44 |

* cited by examiner

*Primary Examiner* — Richard G Keehn
(74) *Attorney, Agent, or Firm* — NORTON ROSE FULBRIGHT US LLP; Gerard A. Messina

(57) ABSTRACT

A method for the digital signing of a message by a sender of the message. A check value based on a symmetrical key pair is ascertained using a secret key as part of a symmetrical key pair and the message. A digital signature is ascertained using a private key as part of an asymmetrical key pair and the check value. The digital signature is provided for transmission, to a method for checking a received, digitally signed message by a receiver.

8 Claims, 2 Drawing Sheets

METHOD FOR THE DIGITAL SIGNING OF A MESSAGE

CROSS REFERENCE

The present application claims the benefit under 35 U.S.C. § 119 of German Patent Application No. DE 102020212451.5 filed on Oct. 1, 2020, which is expressly incorporated herein by reference in its entirety.

FIELD

The present invention relates to a method for the digital signing of a message, to a method for checking a received, digitally signed message as well as to a computing unit and to a computer program for carrying out the same.

BACKGROUND INFORMATION

A digital signature method may be based on an asymmetrical cryptographic system, in which a sender calculates a value for a digital message (i.e., for arbitrary data) with the aid of a secret signature key (the so-called "private key"), which is called a digital signature. This value enables anyone to check the undeniable authorship and integrity of the message with the aid of the public verification key (the so-called "public key").

Such a digital signature method generally includes three functions or routines. Key generation, signature calculation (sign) and signature verification (verify). In this method, the key generation usually generates an asymmetrical key pair made up of a private and a public key. When inputting a message, the sign-routine usually calculates a digital signal using the private key whereas, when inputting a message and a digital signature, the verify-routine usually checks using the public key whether or not the message belongs to the signature.

SUMMARY

According to the present invention, a method for the digital signing of a message, a method for checking a received, digitally signed message, as well as a computing unit and computer program for carrying out the methods are provided. Advantageous embodiments of the present invention are disclosed herein.

The present invention addresses the digital signing of a message and the checking of a message signed in this manner (a digitally signed message in this case is understood to mean the combination of the message itself and the associated digital signature), in particular, with respect to a protection against quantum computer-based attacks. In other words, a digital signature method is provided, the security of which maintains the most security characteristics in the post-quantum era.

A digital signature is generated with the aid of asymmetrical cryptographic algorithms. Two keys are used for this purpose. A private, secret key, which is used for generating the signature, as well as a public key, with the aid of which the signature is verified. These two keys are mutually dependent on one another and thus form a so-called asymmetrical key pair. Known methods for generating asymmetrical keys are based, for example, on a prime factorization of large numbers.

One possibility of detecting transmission errors in a message, i.e., in a set of data, which is to be transmitted from a sender to a receiver, is the use of a hash function or of a hash value. In this case, a check sum or check value—the so-called hash value—is generated with the aid of a hash method such as, for example, "Secure Hash Algorithm" (SHA) over arbitrary large amounts of data, i.e., for example, the message; this does not, however, allow for the check of the (cryptographic) integrity of these data. A secure hash function has the characteristic that no message may be generated that generates a desired hash value.

In order to also protect the integrity of the message, for example, the digital signature is ascertained with the aid of a signature method such as, for example, RSA or based thereon, for example, RSASSA-PSS using the private key and the hash value, or from the hash value. The message may then be transmitted together with the digital signal from a sender who has generated this digital signature to a receiver. This may take place, for example, using a suitable communication means (communication device), for example, via the Internet.

The receiver may then check the digital signature by ascertaining the hash value from the message him/herself (the hash function is known to him/her—and generally also publicly) and by calculating the validity with the aid of the verification routine of the signature method using the public key and the transmitted signature. If this verification is successful, the authenticity and integrity of the message may be assumed.

There is the risk, however, that the cryptographically asymmetrical portion (the digital signature) may be broken by quantum computers—as compared to conventional computers, in any case within a reasonable period of time. Thus, when establishing quantum computers, an attacker has the possibility of falsifying digital signatures. An attacker who has access to a quantum computer may precisely calculate the private key from the public key and possesses as a result all secret pieces of information required for calculating a standard signature.

In accordance with an example embodiment, the present invention provides replacing the hash value in the mentioned digital signature with a check value based on a symmetrical key pair (also referred to as "Message Authentication Code" or MAC for short) A "Message Authentication Code" guarantees for an arbitrary message both integrity as well as authenticity. A MAC may only be generated and checked if the secret key is known. This involves a symmetrical key (or one key of a "symmetrical key pair"), i.e. the same secret key is used both for generating (on the sender side) as well as verifying (on the receiver side) the check value. A method based on a symmetrical key pair is a method, in which both users use the same (at least mutually known or calculable) keys.

Thus, for the digital signing of a message by a sender of the message, a check value or message authentication code based on a symmetrical key pair is ascertained using a secret key as part of a symmetrical key pair and the message. In using a private key as part of an asymmetrical key pair and the check value or message authentication code, the digital signature of the check value is then ascertained and provided for transmission. The message together with the digital signature may then be transmitted from the sender to a receiver.

The receiver may then check the received digitally signed message by ascertaining a check value or message authentication code from the message using a secret key as part of the symmetrical key pair (this involves the same pair also used by the sender). To check the signature, the verification routine is then calculated or a verification is carried out via or with the check value using the public key and the transmitted signature. If the signature to the message is correct, the verification provides a corresponding output and the authenticity and integrity of the message may then be assumed.

As a result of this change of the signature scheme, in which the normally used cryptographic hash value is replaced by a check value (message authentication code (MAC)) based on a symmetrical key pair, an attacker is no longer able—without knowledge of the symmetrical key pair—to generate a valid signature on inherent or changed data (message).

The digital signature may potentially be broken, however, the message authentication code is unable to be recalculated in a trivial manner. With sufficient parameterization, the algorithms such as, for example, HMAC or CMAC used for generating a message authentication code are not significantly easier to break using quantum computers.

In addition, the change of the scheme is also easy to introduce. Message authentication codes are already commonplace. Implementations are found today already in most microcontrollers and processors as well as in cryptographic libraries. The resulting additional resource consumption for calculating this novel method with regard to memory and time increases only marginally compared to conventional signature schemes.

The sole use of a message authentication code, i.e., without signing using the private key, is not sufficient in this case. The method provided has precisely the advantage that the private key of the asymmetrical key pair is not located on the verifying system, i.e., on the receiver—or also on an attacker—itself.

It is thereby protected from extraction as compared to the secret key needed for the message authentication code.

Digital signature schemes are one of the most important applications in cryptography. Thus, the authenticity and integrity of data are ensured and in addition improved still further with the method provided. This may be used, for example, for a secure communication of network users, for the secure execution of software (secure boot), and for the secure transmission of updates (secure flashing), for example on a computing unit, for example, on a control unit, for example, in a system, a vehicle, etc.

The provided digital signature may be used in different ways. If a secret key used system-wide is implemented for all pairs, i.e., sender and receiver, of a communication system (from locally, for example, vehicle network up to globally, for example, the Internet), this key may be used as a secret key as part of the symmetrical key pair or MAC key. Alternatively, a specific or individual key may be stored and used as a MAC key for multiple, but not all, to each pair, thus preventing scalable attacks. In this case, the message authentication code or MAC may still also be utilized for further steps such as, for example, secure boot, secure flashing, combinations thereof, etc.

A computing unit according to the present invention, for example, a user of a communication system such as, for example, a control unit of a motor vehicle is configured, in particular programmed, to carry out a method according to the present invention. The computing unit may thus be a sender or a receiver, for example; however, it is possible of course that a computing unit may be used both as a sender as well as a receiver (in general, another message then being checked as transmitted).

The implementation of a method according to the present invention in the form of a computer program or a computer program product including program code for carrying out all method steps is also advantageous, since this entails particularly low costs, in particular, if an executing computing unit is also utilized for other tasks and is therefore already present. The method is also suitable for devices that have a long service life and are not directly subject to the influence (updateability) of the manufacturer. Suitable data media for providing the computer program are, in particular, magnetic, optical, and electrical memories such as, for example, hard disks, flash memories EEPROMs, DVDs and the like. A download of a program over computer networks (Internet, intranet, etc.) is possible.

Further advantages and embodiments of the present invention result from the description and from the figures.

The present invention is schematically represented in the figures based on an exemplary embodiment and is described below with reference to the figures.

DETAILED DESCRIPTION OF EXAMPLE EMBODIMENTS

Figure 1:
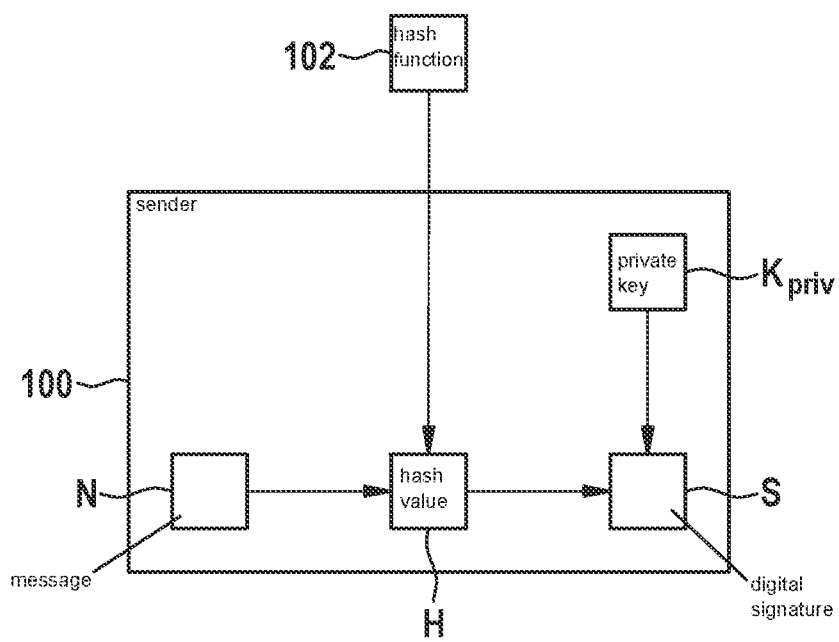
FIG. 1 schematically shows a sequence of methods not according to the present invention for generating and checking a digital signature as a block diagram.
Figure 1:
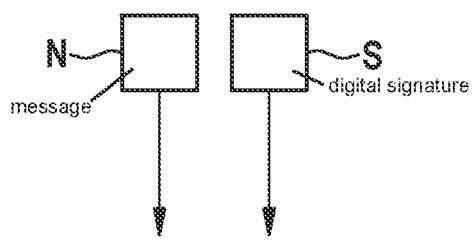
Figure 1:
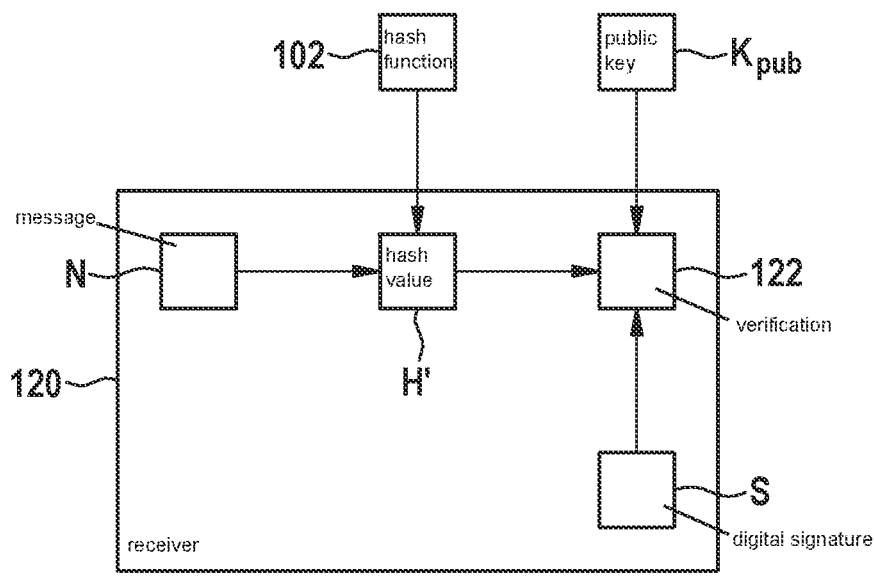

In FIG. 1, a sequence of methods not according to the present invention for generating and checking a digital signature is schematically represented as a block diagram using a conventional hash value.

In a sender 100—this may be a computing unit such as, for example, a control unit or a computer—a message N, which is to be transmitted to a receiver 120—this may also be a computing unit or a computer, is digitally signed. For this purpose, a hash value H is ascertained or calculated from message N using a publicly known hash function 102. A private key $k_{priv}$—known only to sender 100—as part of an asymmetrical key pair is then applied to this hash value H. In this way, a digital signature S is obtained.

This digital signature S together with message N is then transmitted from sender 100 to receiver 120. This takes place via a suitable communication means.

In receiver 120—as also in sender 100—a hash value H' is ascertained from received message N using publicly known hash function 102. With this and received digital signature S, a verification routine is calculated or in general a verification 122 is carried out using a public key $K_{pub}$, which together with private key $K_{priv}$ of the sender forms the asymmetrical key pair.

As a rule,—i.e., without manipulation—verification 122 will indicate that the signature of the hash value is correct. The integrity and authenticity may thereby be assumed per se. If message N is changed on the transmission path, the verification fails.

However, it is possible that digital signal S based on an asymmetrical key pair is broken open by the use of quantum computers. The message could then be changed and an associated digital signature could be generated that would be considered to be genuine. Thus, the manipulation or the attack would not be recognized.

Figure 2:
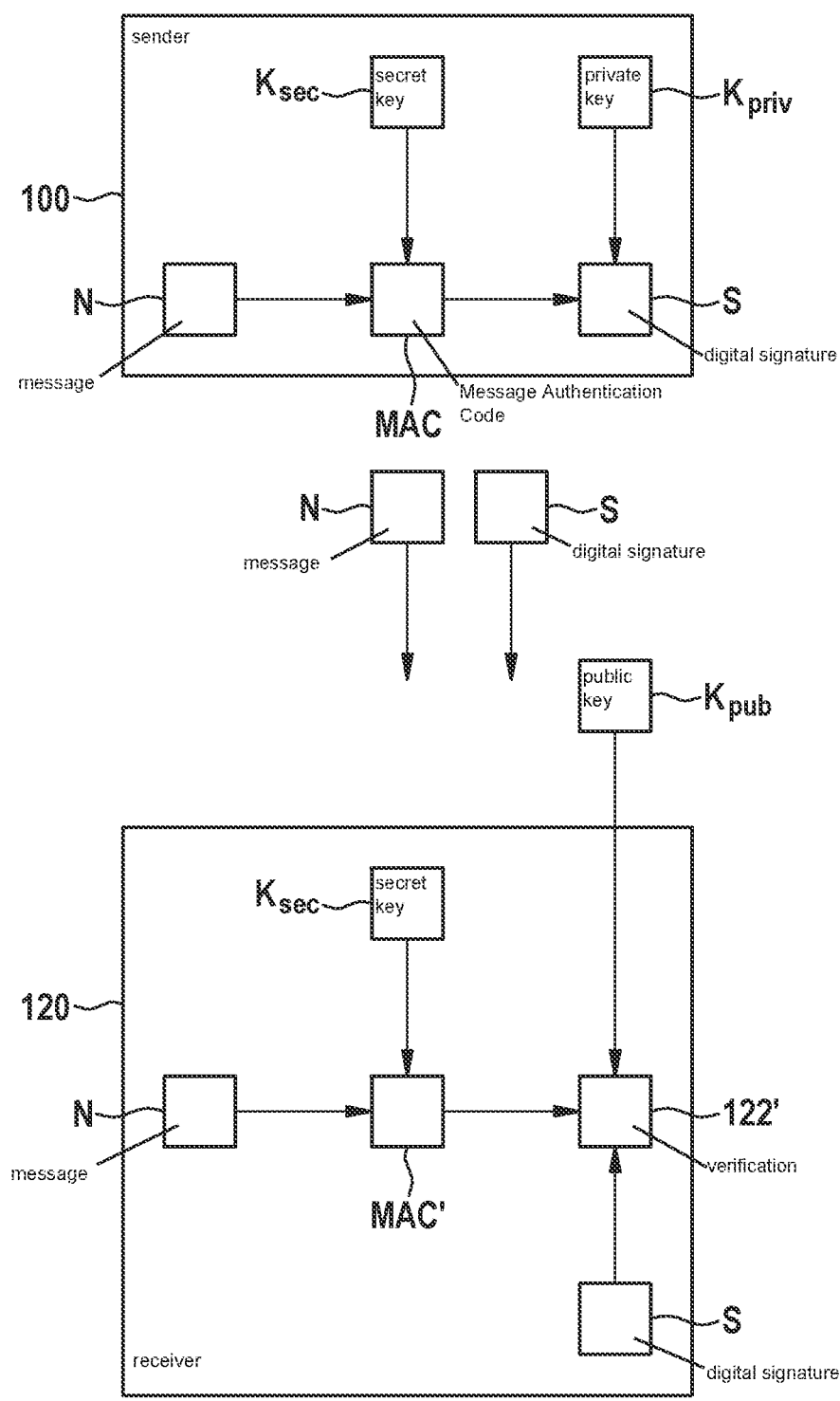
FIG. 2 schematically shows a sequence of methods according to an example embodiment of the present invention for generating and checking a digital signature as a block diagram in preferred specific embodiments.

In FIG. 2, a sequence of methods according to the present invention for generating and checking a digital signature is schematically represented as a block diagram in preferred specific embodiments. In this case, the hash value, as explained with reference to FIG. 1, is replaced by a check value based on a symmetrical key pair, referred to below as message authentication code MAC.

Here too, message N, which is to be transmitted to receiver 120 is digitally signed in sender 100. For this purpose, a message authentication code MAC (check value) is ascertained or calculated with the aid of a suitable MAC method such as CMAC or HMAC using a secret key $K_{sec}$ as part of a symmetrical key pair from message N. Private key $K_{priv}$—known only to sender 100—as part of an asymmetrical key pair is then applied to this message authentication code MAC. In this way, a digital signal S is obtained here too with the aid of a signature method such as, for example, RSASSA-PSS.

This digital signature S together with message N is also transmitted from sender 100 to receiver 120. This takes place via a suitable communication means.

In receiver 120—as also in sender 100—a message authentication code MAC' is then ascertained from received message N using secret key $K_{sec}$ as part of the symmetrical key pair. With this and received digital signature S, the verification routine is calculated or a verification 122' is carried out using the public key $K_{pub}$ as part of the asymmetrical key pair.

As a rule,—i.e., without manipulation—verification 122' will indicate that the signature of the check value is correct. The integrity and authenticity may thus be assumed. If, however, message N has been changed on the transmission path, the verification will fail.

The use, for example, of a quantum computer potentially allows digital signature S to be broken open, i.e., for example, private key $K_{priv}$ may be calculated from public key $K_{pub}$. However, the digital signature to a changed message may not—in contrast to the approach or to the digital signature according to FIG. 1—be generated in such a way that the message authentication code ascertained in the receiver corresponds to the message authentication code ascertained from the message. This is due, in particular, to the fact that MAC methods based on symmetrical key pairs according to the related art are quantum-safe. The manipulation or the attack would thus be recognized.

What is claimed is:

1. A method for digital signing of a message by a sender of the message, the method comprising the following steps:
   ascertaining a check value based on a symmetrical key pair being ascertained using a secret key as part of a symmetrical key pair, and the message;
   ascertaining a digital signature using a private key as part of an asymmetrical key pair, and the check value; and
   providing the digital signature for transmission.

2. The method as recited in claim 1, wherein the message together with the digital signature is transmitted from the sender.

3. The method as recited in claim 1, wherein a system-wide, secret key is used as the secret key as part of the symmetrical key pair.

4. The method as recited in claim 1, wherein a secret key individually assigned to an executing pair including a sender and a receiver is used as the secret key as part of the symmetrical key pair.

5. The method as recited in claim 1, wherein the method is used for the digital signature of messages in a communication of network users, or for a secure storing of software or data on memory media.

6. A method for checking a received, digitally signed message by a receiver, the digitally signed message including a digital signature, the method comprising the following steps:
   ascertaining a check value using a secret key as part of a symmetrical key pair, and the message; and
   carrying out a verification with the ascertained check value and the digital signature using a public key as part of an asymmetrical key pair.

7. A computing unit for digital signing of a message by a sender of the message, the computing unit configured to:
   ascertain a check value based on a symmetrical key pair being ascertained using a secret key as part of a symmetrical key pair, and the message;
   ascertain a digital signature using a private key as part of an asymmetrical key pair, and the check value; and
   provide the digital signature for transmission, wherein the computing unit includes a processor.

8. A non-transitory machine-readable memory medium on which is stored a computer program for digital signing of a message by a sender of the message, the computer program, when executed by a computing unit, causing the computing unit to perform the following steps:
   ascertaining a check value based on a symmetrical key pair being ascertained using a secret key as part of a symmetrical key pair, and the message;
   ascertaining a digital signature using a private key as part of an asymmetrical key pair, and the check value; and
   providing the digital signature for transmission.

* * * * *